United States Patent
Frey et al.

(10) Patent No.: US 8,157,582 B2
(45) Date of Patent: Apr. 17, 2012

(54) TELECOMMUNICATIONS PATCH PANEL

(75) Inventors: James Frey, Woodbury, CT (US); Peter Thickett, Watertown, CT (US)

(73) Assignee: The Siemon Company, Watertown, CT (US)

(*) Notice: Subject to any disclaimer, the term of this patent is extended or adjusted under 35 U.S.C. 154(b) by 32 days.

(21) Appl. No.: 12/752,206

(22) Filed: Apr. 1, 2010

(65) Prior Publication Data

US 2010/0255716 A1  Oct. 7, 2010

Related U.S. Application Data

(60) Provisional application No. 61/165,969, filed on Apr. 2, 2009.

(51) Int. Cl.
  *H01R 13/66* (2006.01)
(52) U.S. Cl. .................................................. 439/540.1
(58) Field of Classification Search ................ 439/540.1
  See application file for complete search history.

(56) References Cited

U.S. PATENT DOCUMENTS

| | | | |
|---|---|---|---|
| 5,575,665 A | 11/1996 | Shramawick et al. | |
| 6,053,764 A | 4/2000 | Curry et al. | |
| 6,667,435 B1 | 12/2003 | French et al. | |
| 7,343,078 B2 | 3/2008 | Spisany et al. | |
| 7,641,513 B2* | 1/2010 | Hoath et al. | 439/540.1 |
| 7,811,123 B2* | 10/2010 | Hoath et al. | 439/540.1 |
| 7,934,948 B2* | 5/2011 | Follingstad | 439/534 |

OTHER PUBLICATIONS

International Search Report for International Patent Application PCT/US2010/029018, mailed May 21, 2010, 4 pages.
Written Opinion for International Patent Application PCT/US2010/029018, mailed May 21, 2010, 6 pages.

* cited by examiner

*Primary Examiner* — Gary F. Paumen
(74) *Attorney, Agent, or Firm* — Cantor Colburn LLP

(57) ABSTRACT

A patch panel for telecommunications connectors includes a patch panel frame having a front face, the front face having a series of openings therein for receiving telecommunications plugs; the patch panel frame including a tray extending rearward from a bottom portion of the front face; and a plurality of multiport bezels mounted to the patch panel frame, each multiport bezel having a plurality of cavities, each cavity aligned with one of the openings in the front face.

18 Claims, 19 Drawing Sheets

TELECOMMUNICATIONS PATCH PANEL

CROSS-REFERENCE TO RELATED APPLICATIONS

This application claims the benefit of U.S. provisional patent application 61/165,969 filed Apr. 2, 2009, the entire contents of which are incorporated herein by reference.

BACKGROUND

Telecommunications patch panels are used to provide a location for a number of ports or outlets to interface with cabling for interconnecting with a variety of devices and equipment. When wires are connected to an outlet, this is referred to in the art as outlet termination. Current patch panel outlet termination falls into two broad categories; (1) terminate in panel (typically punch down), and (2) terminate-out-of-panel (may be punch down or "toolless") and then fix as individuals or groups to the patch panel. For terminate-out-of-panel type panels, the termination may be performed where the installer can easily see, manipulate, and inspect the terminations (a significant advantage). The art would be benefited by improvements in the ease, speed and reliability of terminating and installing outlets into a patch panel.

Further, each outlet or port in a patch panel is typically labeled with a port identifier. These port identifiers may come in a variety of forms. The art would be benefited by improvements in the clarity and flexibility of port identifiers.

SUMMARY

An embodiment is a patch panel for telecommunications connectors including a patch panel frame having a front face, the front face having a series of openings therein for receiving telecommunications plugs; the patch panel frame including a tray extending rearward from a bottom portion of the front face; and a plurality of multiport bezels mounted to the patch panel frame, each multiport bezel having a plurality of cavities, each cavity aligned with one of the openings in the front face.

An alternate embodiment includes a telecommunications rack including a first patch panel having two rows of openings, the openings having a horizontal spacing and a vertical spacing; a second patch panel mounted adjacent the first patch panel, the second patch panel having two rows of openings, the openings having the same horizontal spacing and the same vertical spacing; wherein a row of openings in the first patch panel is spaced from a row in the second patch panel by the same vertical spacing.

DETAILED DESCRIPTION

Figure 1:
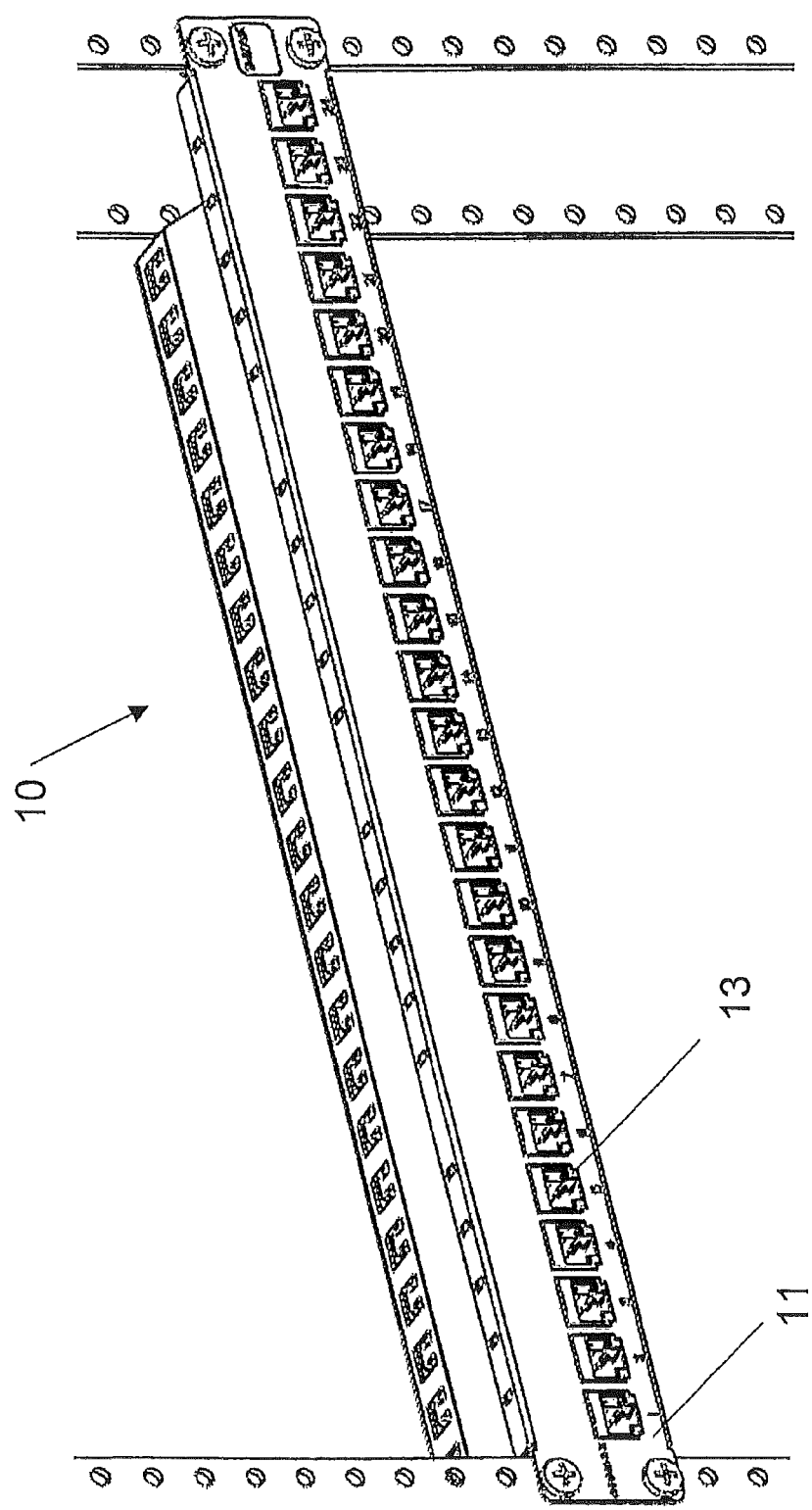
FIG. 1 is a perspective view of a patch panel in embodiments of the invention.

FIG. 1 is a perspective view of a 24 port, 1U patch panel 10 mounted to a rack. As known in the art, the patch panel may have a predefined width (e.g., 19 inches) to fit in existing racks. The height of the patch panel 10 is 1 rack unit, also referred to as 1U in the art. A front face 11 of patch panel 10 includes openings 13 for receiving telecommunications plugs. The plugs mate with outlets installed in bezels as described in further detail herein. The patch panel of FIG. 1 includes 24 ports or openings 13, but it is understood that any number of ports may be provided, and embodiments of the invention are not limited to 24 port patch panels. The patch panel may be silk-screened or labeled in some other fashion to reflect brand name or port numbering. Port labeling features (e.g., identifying ports by a port identifier or other representation) are described in further detail herein.

Figure 2:
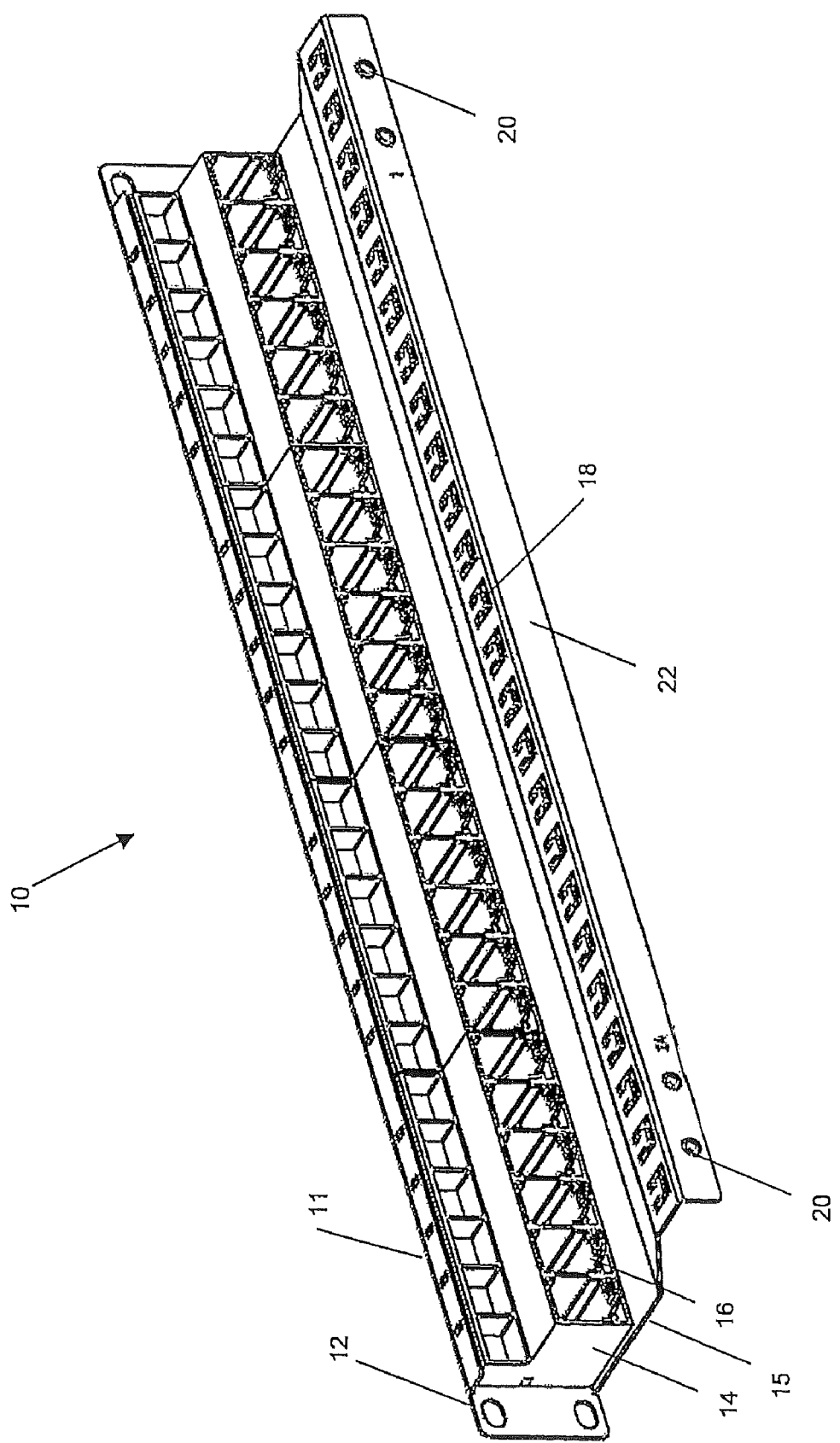
FIG. 2 is a rear, perspective view of the patch panel of FIG. 1.

FIG. 2 is a rear, perspective view of a 24 port, 1U patch panel 10. The patch panel 10 includes a patch panel frame 12 which is, for example, made from a sheet metal piece bent and cut to provide the features described herein. Extending from front face 11 is a tray 15. Tray 15 supports multiport bezels 14. Mounted to the patch panel frame 12 are a number (e.g., 4) of single row, multiport bezels 14. Each single row, multiport bezel 14 includes a plurality of cavities 16 for receiving individual outlets. Cavities 16 are aligned with the openings 13 in the front face 11 of the patch panel frame 12. Features of the single row, multiport bezels 14 are described in further detail herein.

The patch panel frame 12 includes a number of cable tie down points 18 formed in the tray 15, for securing cables to the patch panel 10. Two ground lug mounting locations 20 are provided on both ends of the patch panel frame 12, on a lip 22 formed extending from the tray 15 on a rear of the patch panel frame 12.

Figure 3:
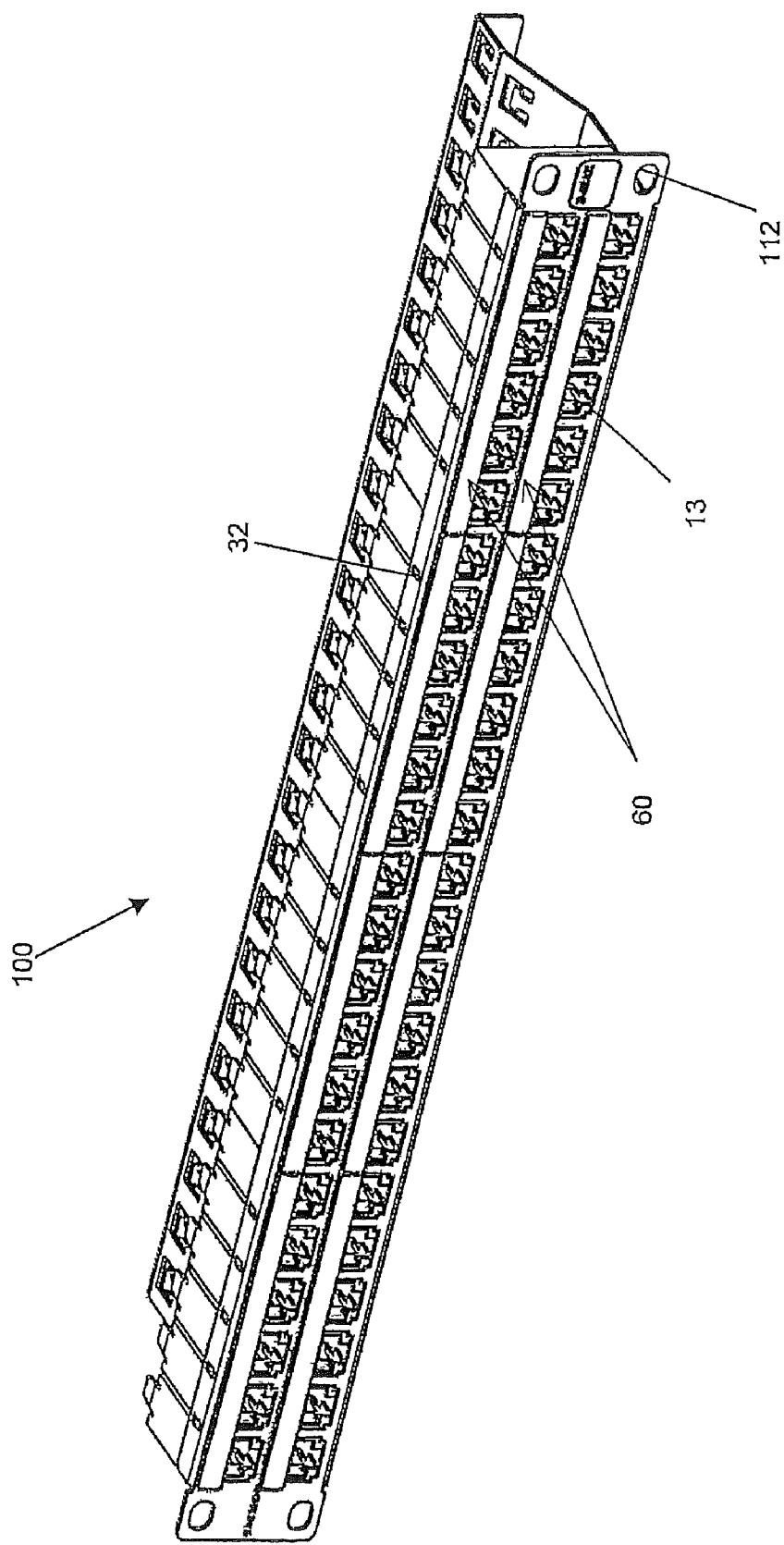
FIG. 3 is a perspective view of a patch panel in an alternate embodiment.

FIG. 3 is a perspective view of a 48 port, 1U patch panel 100. The patch panel frame 112 includes two rows of openings 13 for access to outlets. Two rows of label holders 60 are provided so that labeling is provided above each port even in a 48 port, 1U patch panel. This provides clearer labeling of ports when compared to labeling schemes that use a single label between two rows of ports. The label holders 60 are described in further detail herein. Further, there are two rows of cable tie down points 18, one row for each row of outlets.

Figure 4:
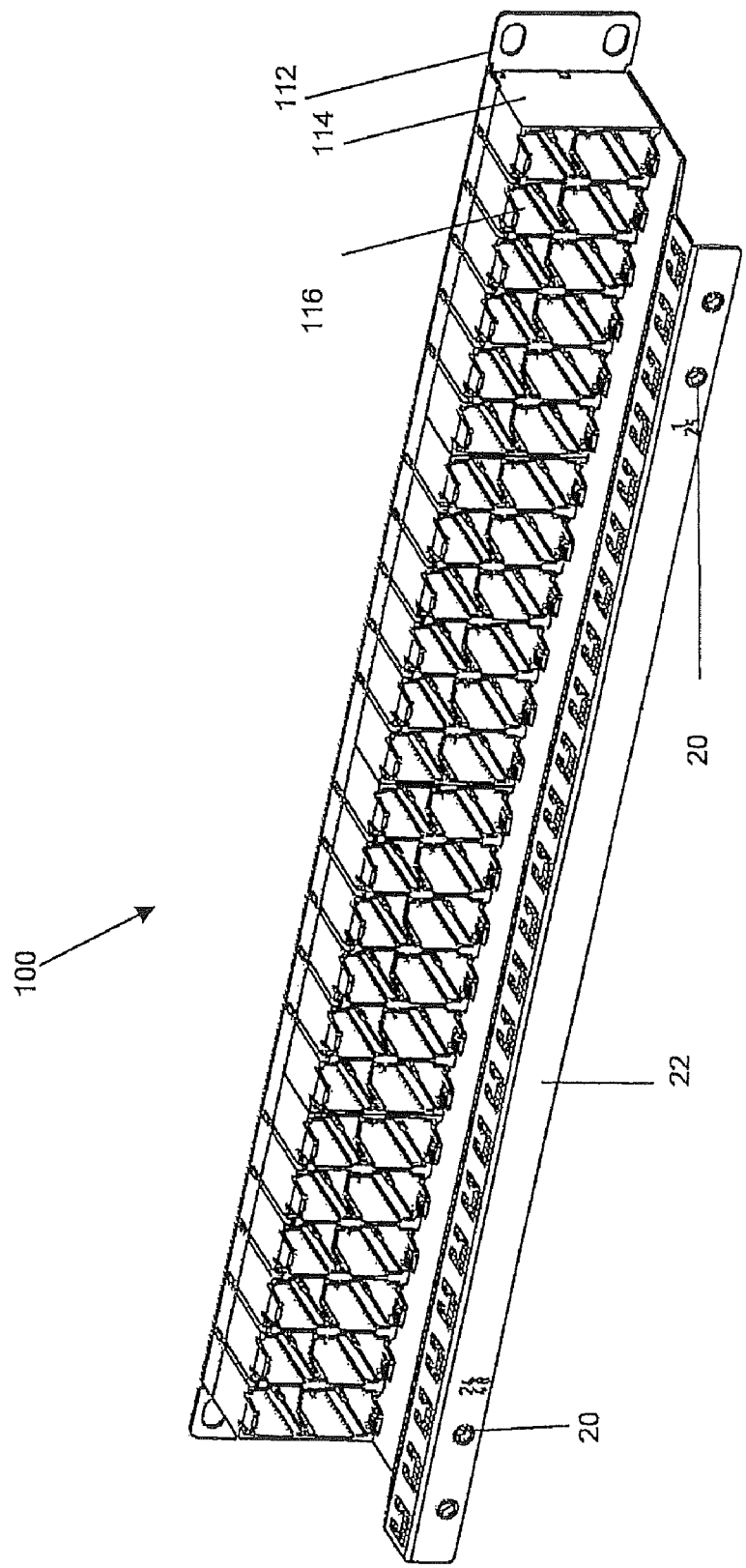
FIG. 4 is a rear, perspective view of the patch panel of FIG. 3.

FIG. 4 is a rear, perspective view of a 48 port, 1U patch panel 100. The patch panel 100 includes a patch panel frame 112 which is, for example, made from a sheet metal piece bent and cut to provide the features described herein. Mounted to the patch panel frame 112 are a number (e.g., 4) of dual row, multiport bezels 114. Each dual row, multiport bezel 114 includes a plurality of cavities 116 for receiving individual outlets. Features of the dual row, multiport bezels 114 are described in further detail herein.

Figure 5:
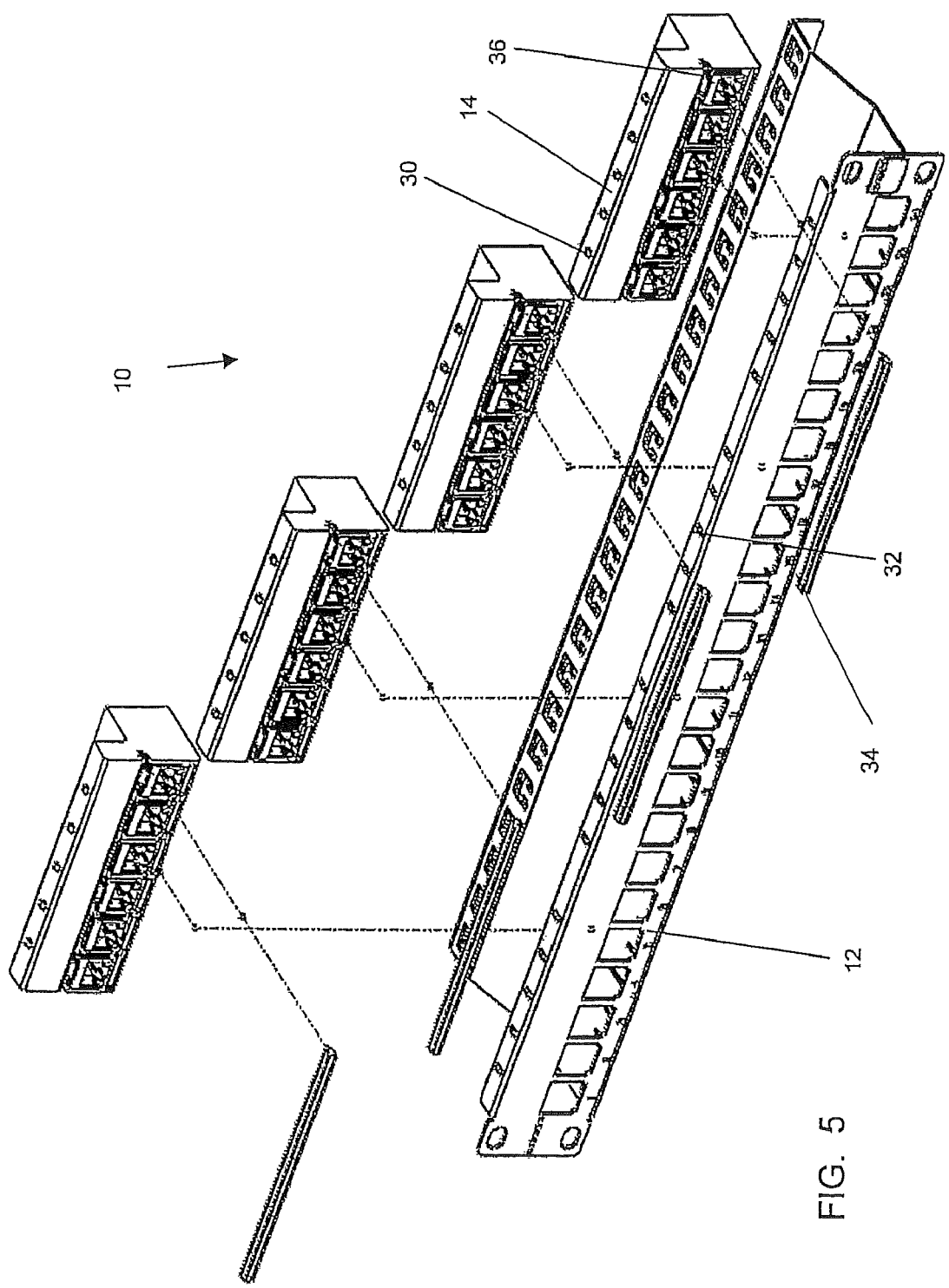
FIG. 5 is an exploded, perspective view of the patch panel of FIG. 1.

FIG. 5 is an exploded, perspective view of a 24 port, 1U patch panel 10. FIG. 5 shows the single row, multiport bezels 14 away from the patch panel frame 12. Each single row, multiport bezel 14 includes a plurality of nubs 30 on a top surface thereof that engage openings 32 formed in the patch panel frame 12. Each single row, multiport bezel 14 includes a notch 36 formed on a front face thereof, above outlet cavities 16, running the length of the multiport bezel 14. The notch 36 receives a conductive strip 34. In exemplary embodiments, the conductive strip 34 is made from a conductive, compressible foam. The conductive strip 34 makes a physical and electrical contact with the rear side of front face 11 of patch panel frame 12. When a shielded outlet is mounted in a cavity 16, the conductive housing of the outlet makes contact with the conductive strip 34 to ground the outlet housing.

Figure 6:
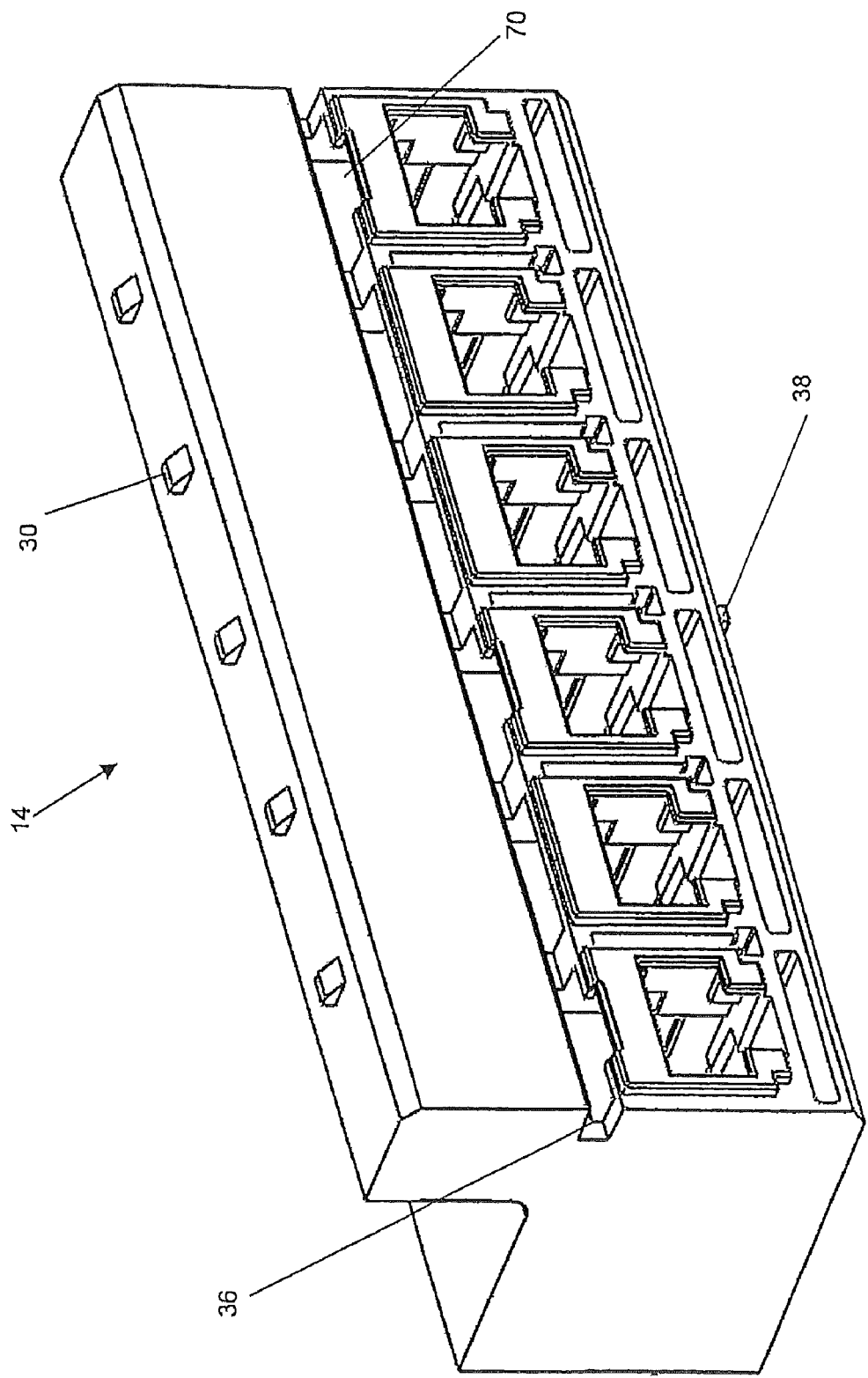
FIG. 6 is a perspective view of a multiport bezel.

FIG. 6 is a perspective view of a single row, multiport bezel 14. Shown in FIG. 6 are nubs 30 that engage openings 32 in patch panel frame 12. A guide 38 is formed on a bottom surface of the single row, multiport bezel 14. The guide is a linear rib that facilitates alignment of the single row, multiport bezel 14 to the patch panel frame 12 as described in further detail herein. Above certain cavity openings, a cutout 70 is formed proximate to notch 36. When mounted to the patch panel frame 12, the cutout 70 extends below an outlet opening 13 in the patch panel frame 12. This forms an opening for receiving tabs on a label holder as described in further detail herein.

Figure 7:
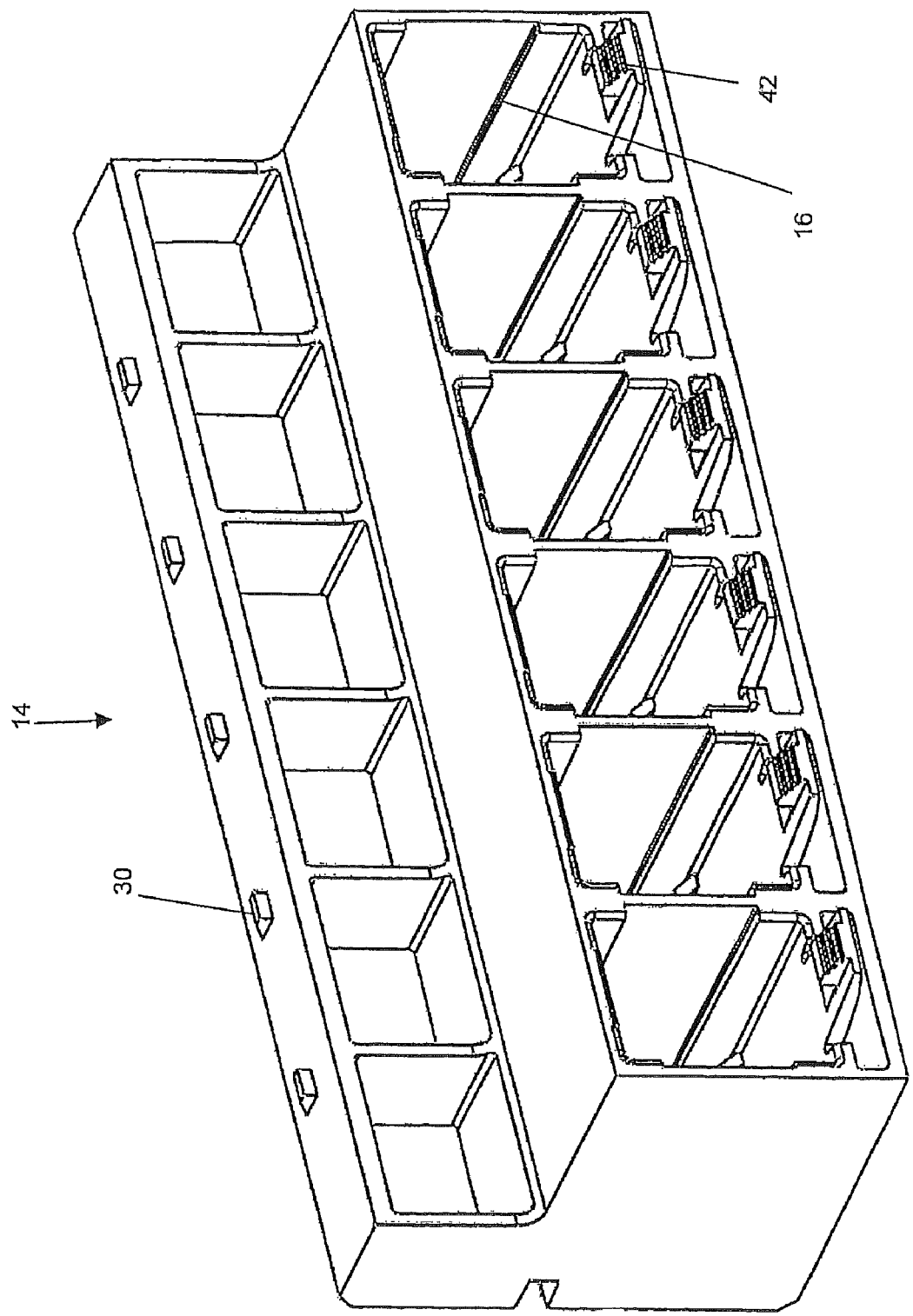
FIG. 7 is a rear, perspective view of the multiport bezel of FIG. 6.

FIG. 7 is a rear, perspective view of a single row, multiport bezel 14. Shown in detail in FIG. 7 are latches 42 that secure an outlet in the cavity 16 as described in further detail herein. The latches 42 are serrated to aid in keeping a screwdriver or other tool from slipping off the latch 42. The latches 42 are sized and shaped to be reached by a person's finger, thereby providing tool less removal of outlets.

Figure 8:
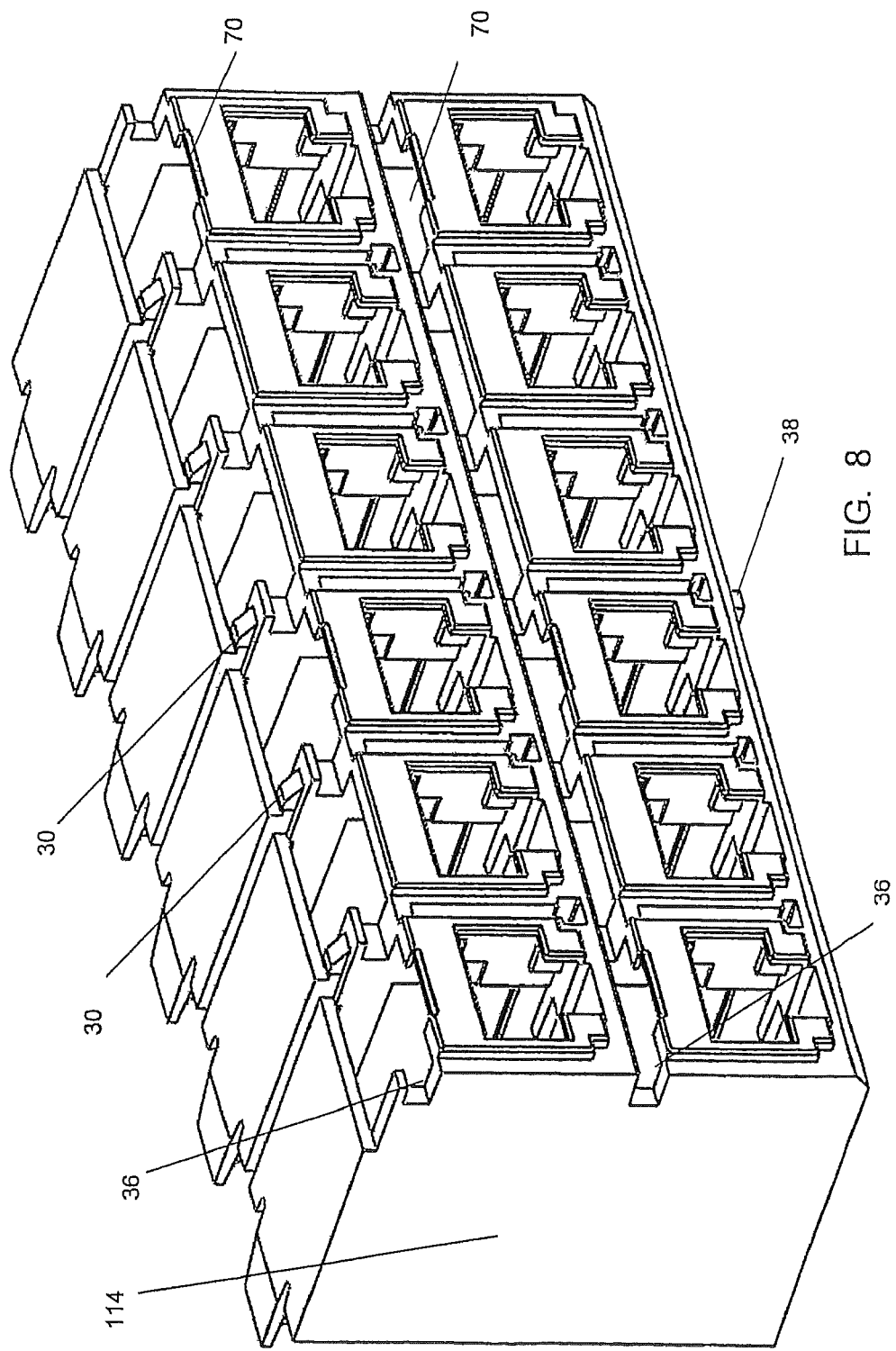
FIG. 8 is a perspective view of a multiport bezel in an alternate embodiment.
Figure 9:
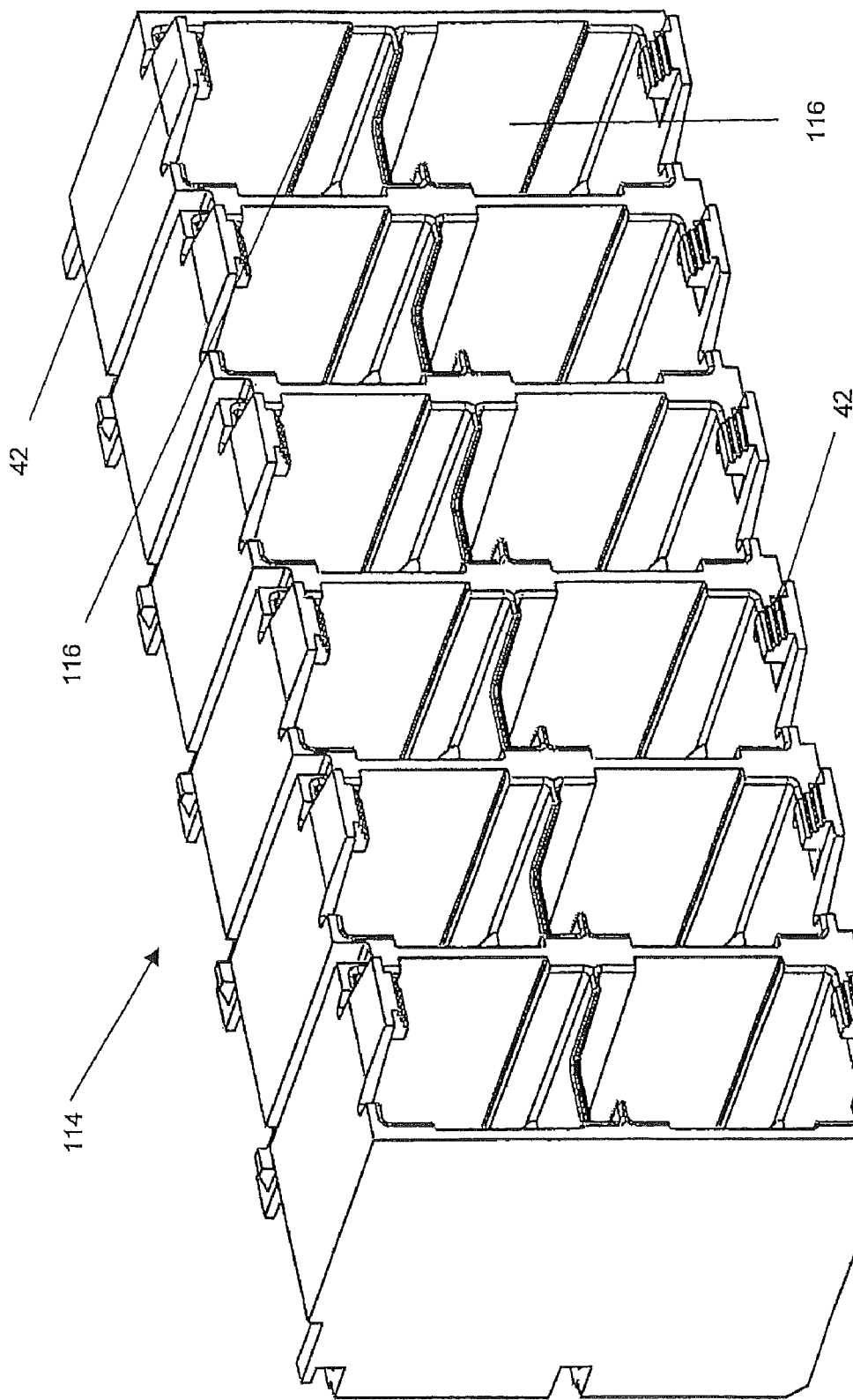
FIG. 9 is a rear, perspective view of the multiport bezel of FIG. 8.

FIG. 8 is a perspective view of a dual row, multiport bezel 114. The dual row, multiport bezel 114 is used with the 48 port, 1U patch panel 100. The dual row, multiport bezel 114 includes nubs 30 that engage openings in the 48 port, 1U patch panel 100. The dual row, multiport bezel 114 also includes a guide 38 as described above. As there are two rows of outlet openings, there are two notches 36 for receiving conductive strips 34. FIG. 9 is a rear, perspective view of a dual row, multiport bezel 114. The dual row, multiport bezel 114 includes latches 42 for securing outlets in cavities 116 as described above.

Figure 10:
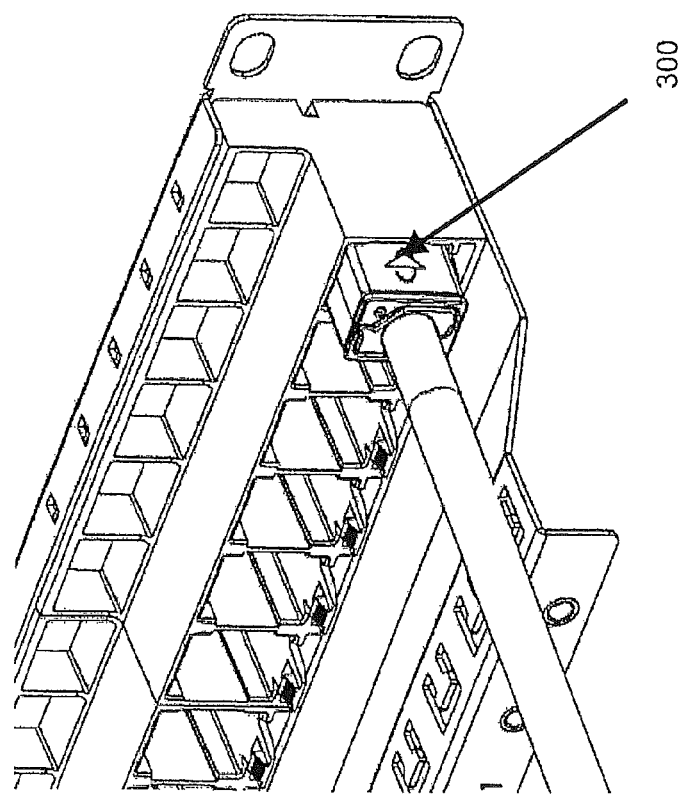
FIG. 10 is a perspective view depicting an outlet being positioned in the multiport bezel of FIG. 8.

FIG. 10 is a perspective view of an outlet being mounted in a cavity of a single row, multiport bezel. An outlet 300 is inserted into cavity 16 along a linear axis. Outlet 300 may be similar to the outlet described in U.S. patent application Ser. No. 12/058,004, the entire contents of which are incorporated herein by reference. When the outlet 300 initially enters cavity 16, latch 42 is deflected downward by the housing of outlet 300. Once the housing clears latch 42, latch 42 flexes upwards and returns to its rest position to secure outlet 300 to the single row, multiport bezel 14. This state is shown in FIG. 11.

Figure 11:
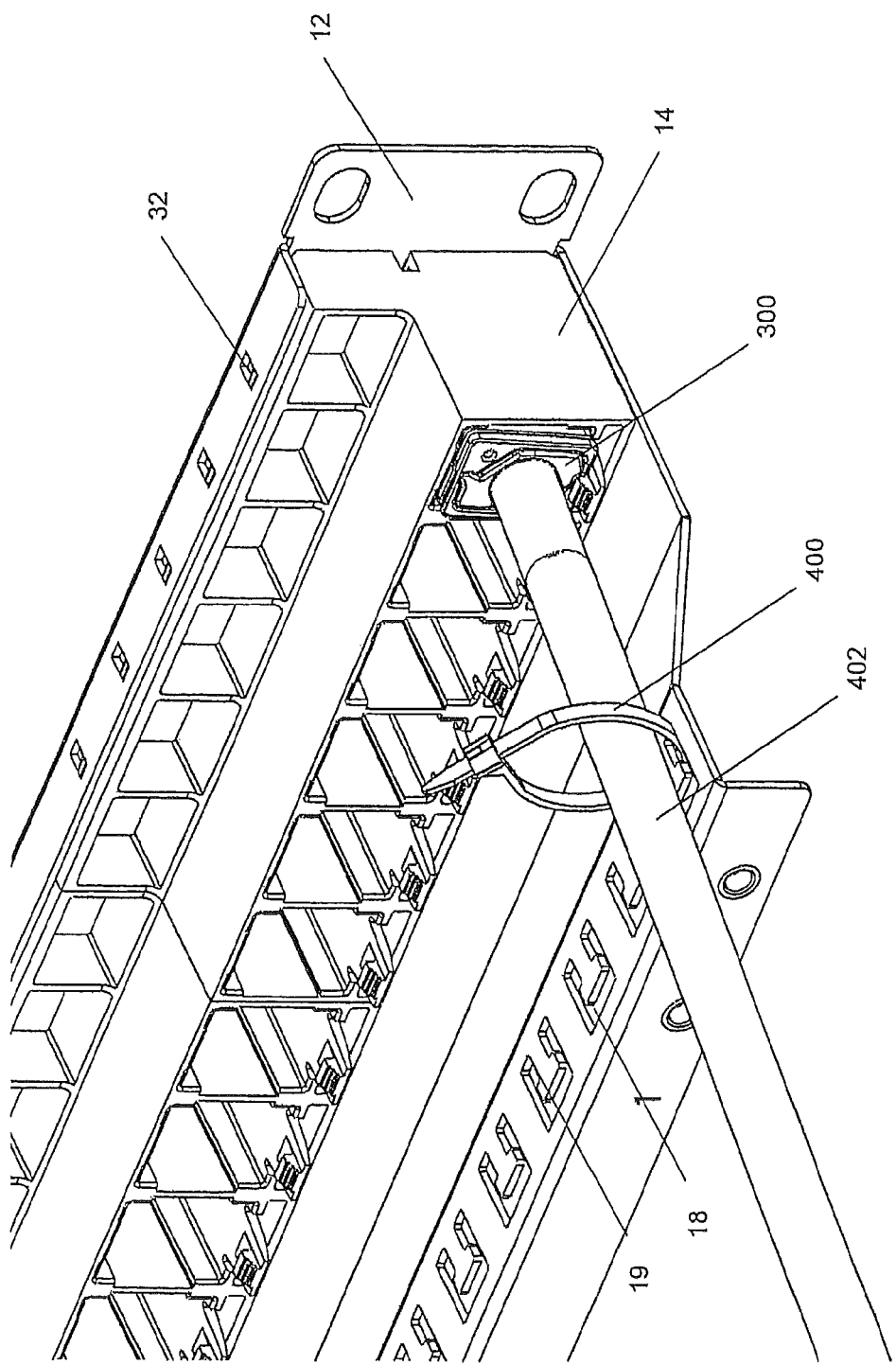
FIG. 11 is a perspective view depicting a cable tie down element.

FIG. 11 is a perspective view of installation of a cable manager 400. The cable tie down point 18 is defined by a rectangular or square opening having a T-shaped prong 19 positioned therein. The T-shaped prong extends along the axis of insertion of the outlet 300. In FIG. 11, the distal end of the T is pointing away from the single row, multiport bezel 14. In alternate embodiments, the distal end of the T is pointing towards the single row, multiport bezel 14. The cable manager 400 (e.g., a cable tie-down) may be looped around cable 402, inserted into the opening in cable tie down point 18, and slid over T-shaped prong 19. The cable manager 400 is then tightened to secure the cable 402 to the cable tie down point 18.

Figure 12A:
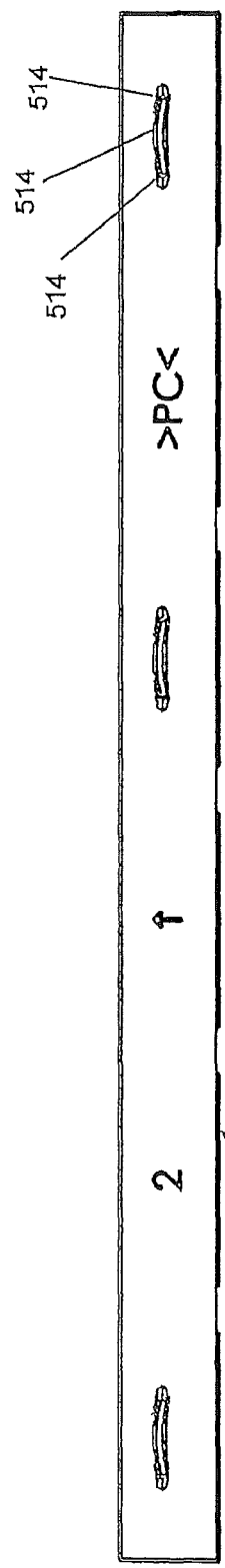
FIGS. 12A and 12B are rear and perspective views of a label holder.
Figure 12B:
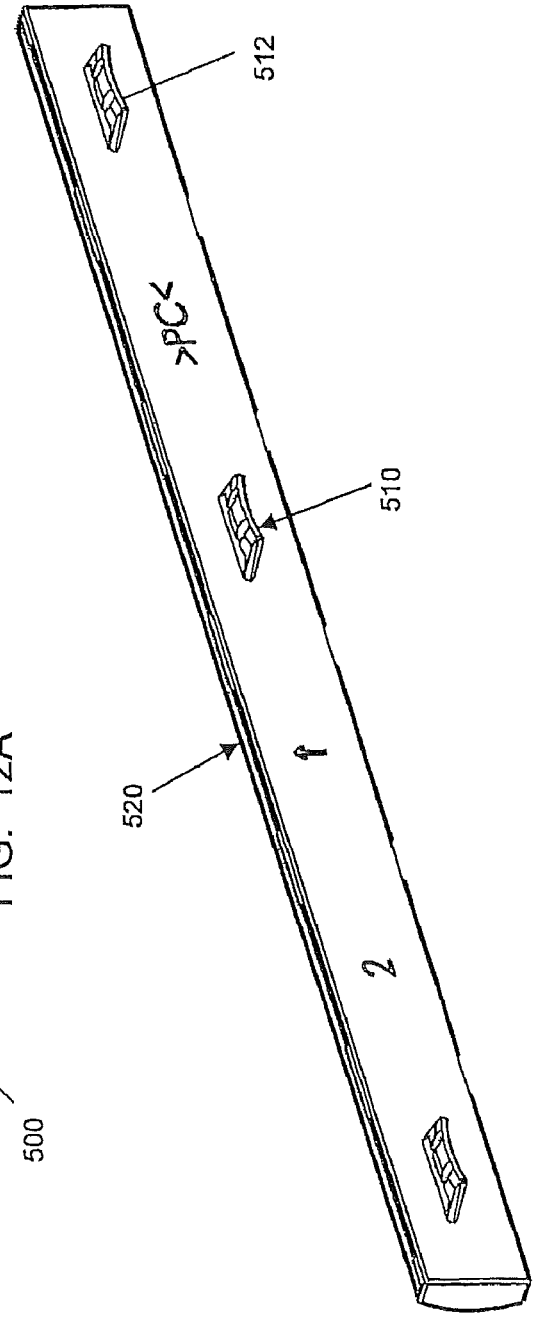

FIGS. 12A and 12B depicts rear and rear, perspective views of a label holder 500. Label holder 500 is made from a clear material and includes a pocket 520 formed between front and rear faces of the label holder 500. Latches 510 extend from the rear face of the label holder 500. Latches 510 have an arcuate body 512 with protrusions 514 formed on an upper surface of the arcuate body 512. As noted above, the latches 510 are inserted in openings formed by the cutouts 70 formed above the outlet openings in the single row, multiport bezel 14 and dual row, multiport bezel 114.

In mounting the label holder 500 to a panel, latches 510 engage openings provided by cutouts 70. The arcuate body 512 deflects to a linear shape to enter the cutout 70 and then resumes its rest shape once projections 514 clear the edge of the patch panel. The edge of the patch panel rests in a recess defined by the projections 514 to secure the label holder 500 to the patch panel 10 or 100.

Figure 13A:
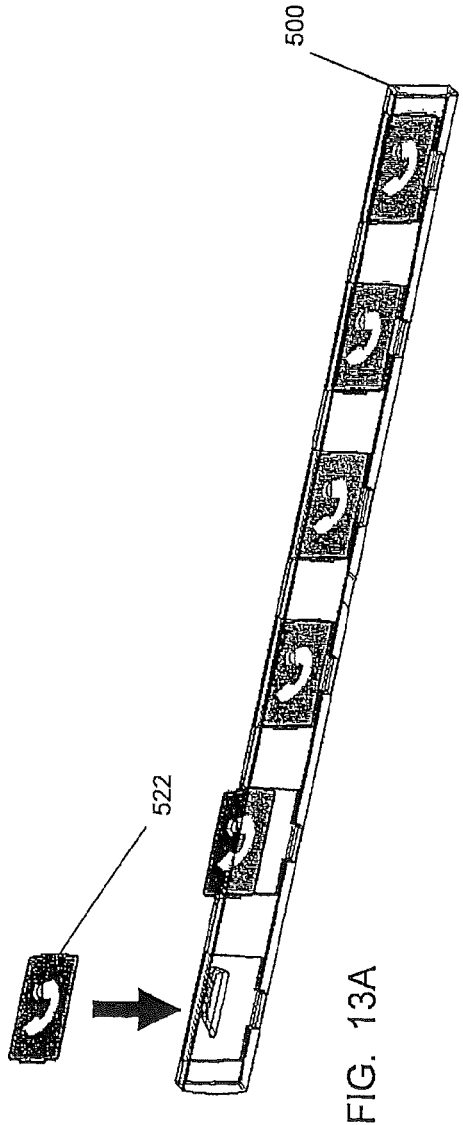
FIGS. 13A and 13B depict using icons and label strips with the label holder of FIGS. 12A and 12B.
Figure 13B:
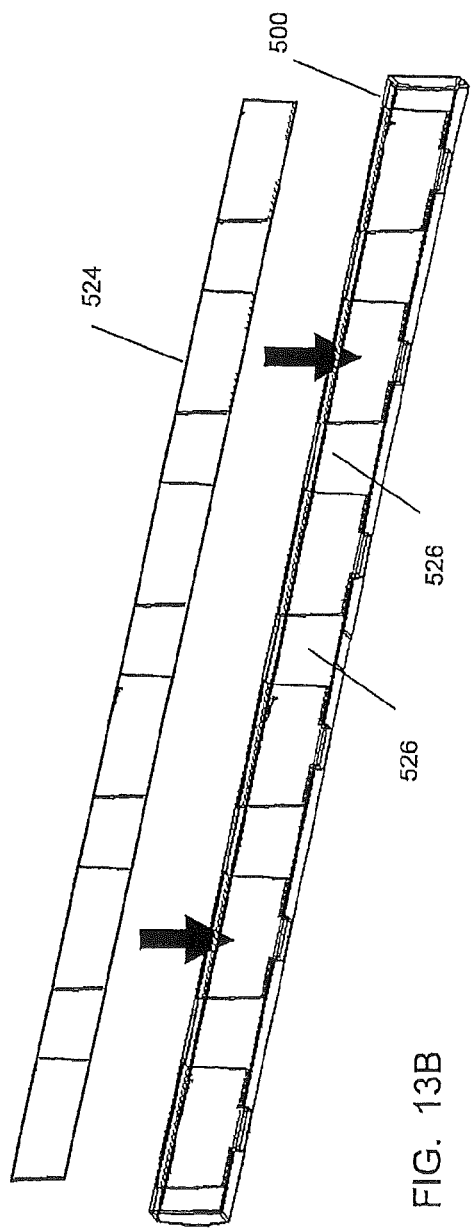

FIGS. 13A and 13B depict label icons 522 or a label strip 524 being mounted in the label holder 500. The pocket 520 can receive a label strip 524 that extends from one end of the label holder 500 to the other. The label strip may be written on or otherwise imprinted on to identify ports on the patch panel. The icons are discrete elements that may be made from paper, card stock, plastic, etc. The icons may also include indicia identifying the port or representing the nature of the port (e.g., voice or data). The pocket 520 includes internal ribs that keep the icons 522 in position laterally once placed in the label holder 500.

Figure 14:
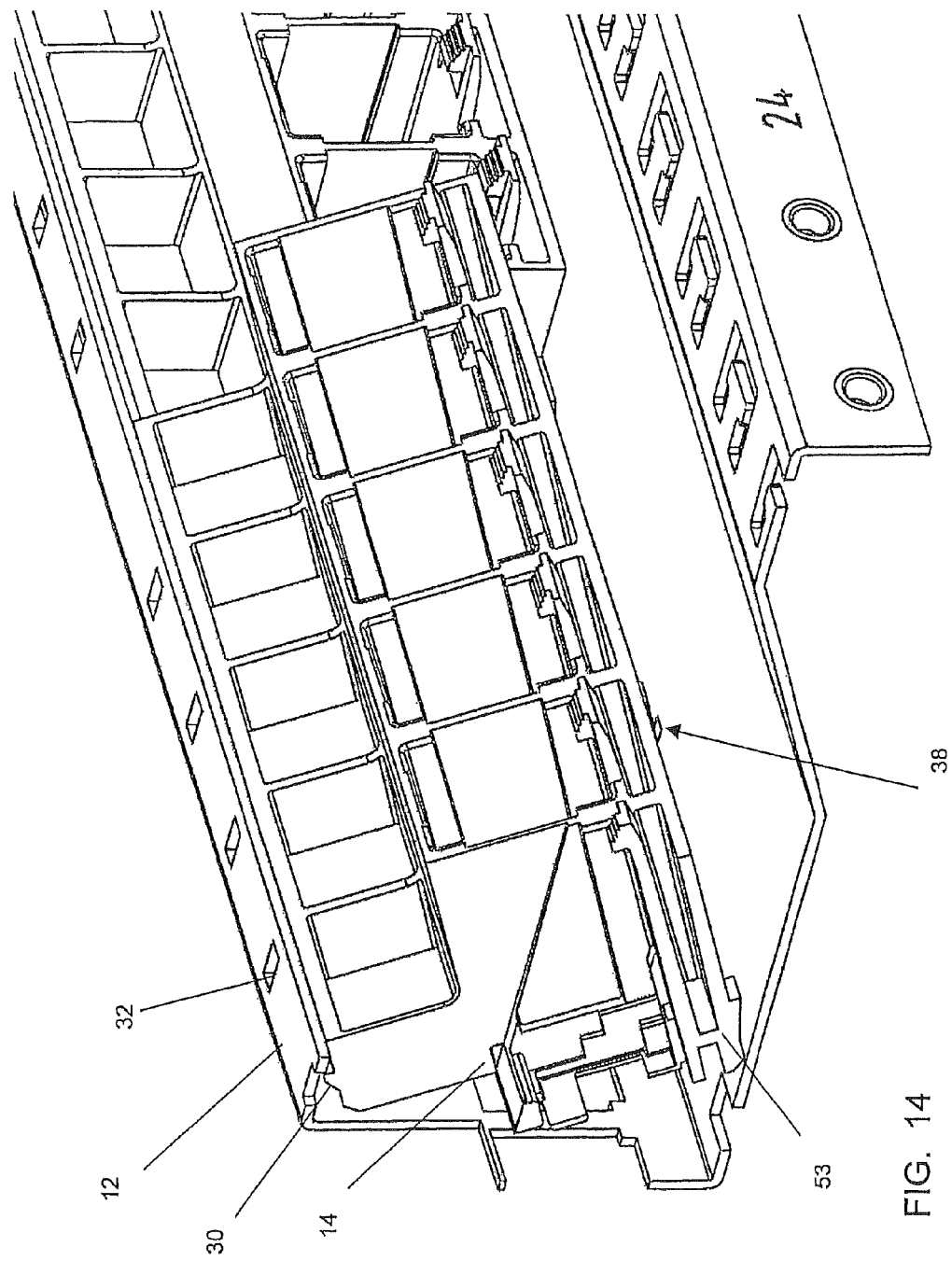
FIG. 14 is a perspective view depicting installing a multiport bezel into a patch panel.

FIG. 14 illustrates installation of a single row, multiport bezel in a panel frame of a 24 port, 1U patch panel 10. The installation requires no tools and facilitates assembly of the patch panel 10. The single row, multiport bezel 14 is inserted in the panel frame 12 with the upper, front edge leading the single row, multiport bezel 14. The single row, multiport bezel 14 is rotated so that nubs 30 engage openings 32 in the patch panel frame 12. Guide 38 enters slot 50 (FIG. 15) to maintain travel of the single row, multiport bezel 14 on a linear path.

Figure 15:
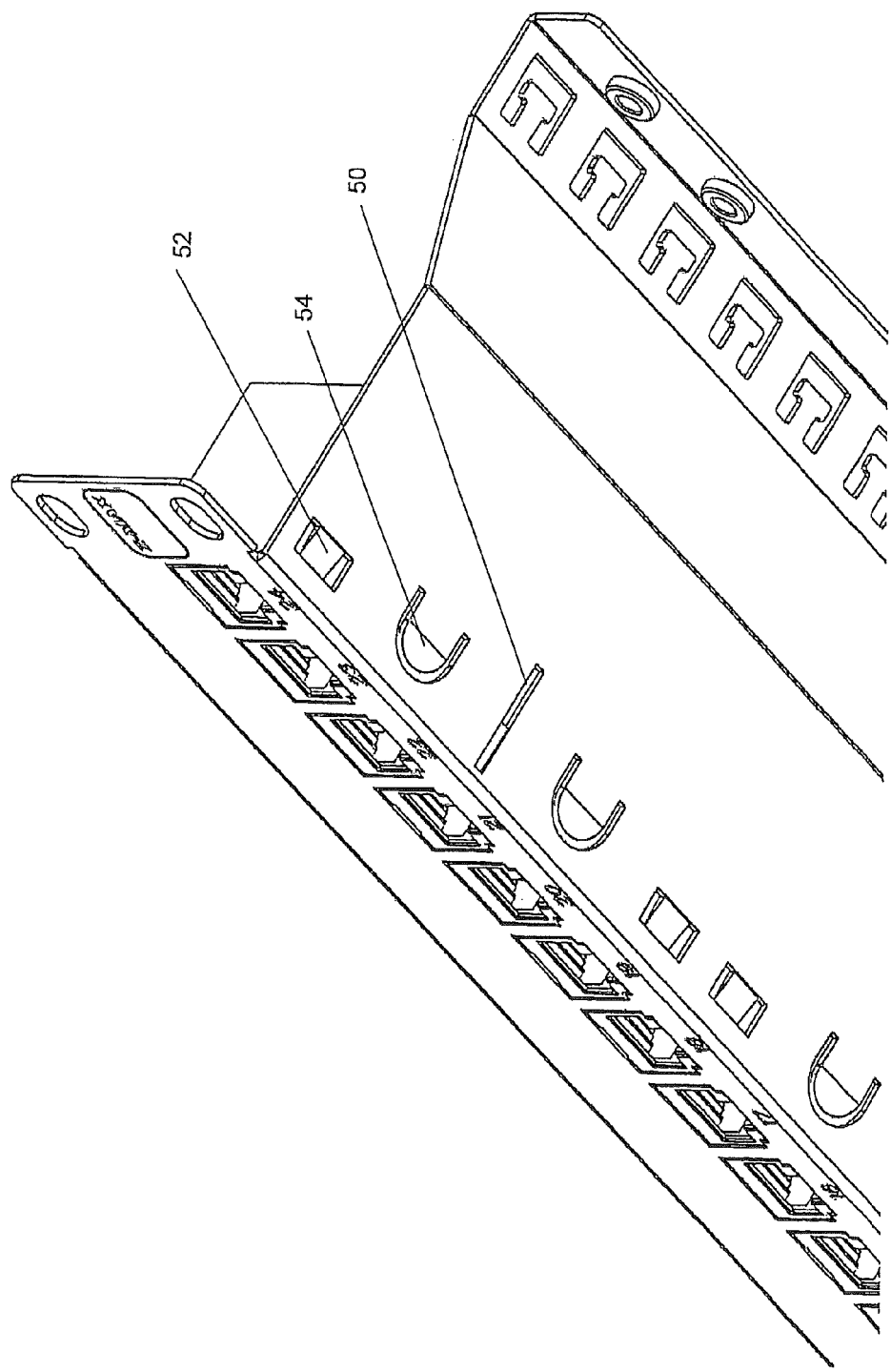
FIG. 15 is a perspective view a tray portion of the patch panel.

FIG. 15 is a perspective view of a patch panel frame 12 showing details of tray 15. Openings 52 receive latches 53 on the single row, multiport bezel 14. Tension members 54 are formed in the base of patch panel frame 12 by bending a tab upwards from the base. When the single row, multiport bezel 14 is mounted to the patch panel frame 12, the tension member applies a spring force to the bottom of the single row, multiport bezel 14. This force positions the single row, multiport bezel 14 relative to the patch panel frame 12 and produces a secure fit in the patch panel frame 12.

Figure 16:
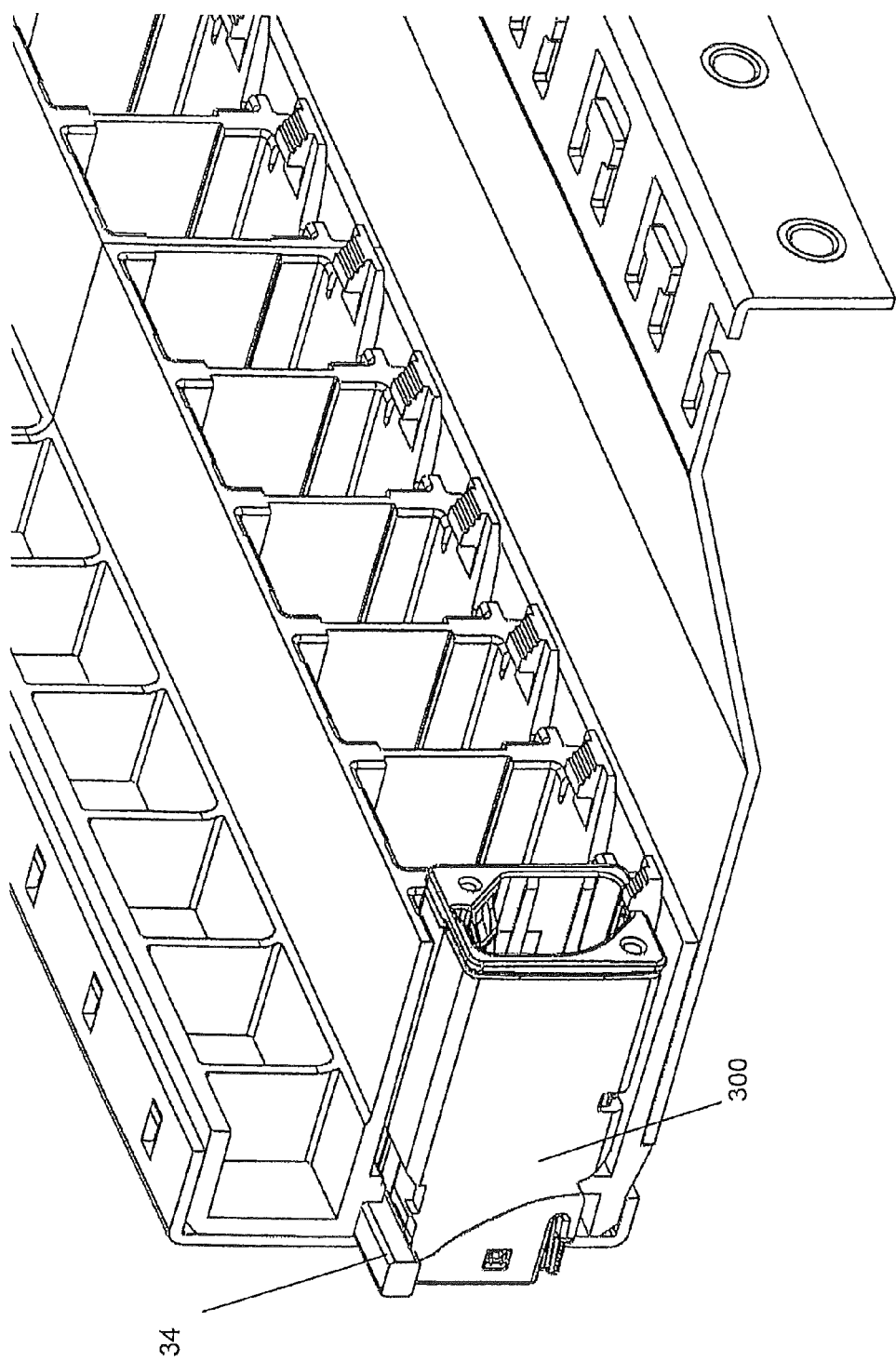
FIG. 16 is a perspective view depicting the conductive strip mounted in the patch panel.

FIG. 16 illustrates an outlet 300 mounted in a cavity of single row, multiport bezel installed in a panel frame of a 24 port, 1U patch panel. As shown in FIG. 16, the conductive strip 34 contacts the housing of the outlet 300. In embodiments where the outlet is a shielded outlet with a conductive housing, the outlet housing is connected to ground through the conductive strip 34, patch panel frame 12 and ground lugs at ground lug locations 20. It is understood that an unshielded outlet may be mounted in the single row, multiport bezel 14 with no adverse effects. It should be noted that the dual row, multiport bezel 114 is mounted to the patch panel frame 112 in the same manner and the description of FIGS. 14-15 pertains equally to the dual row, multiport bezel 114.

Figure 17:
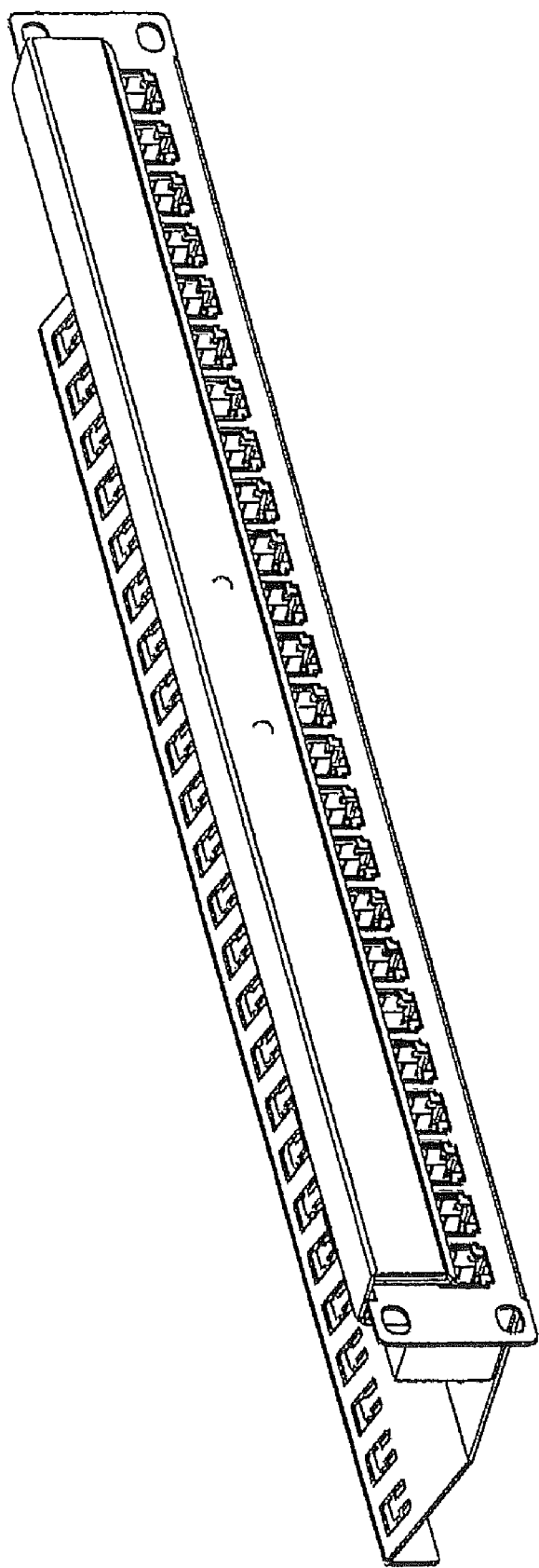
FIG. 17 is a perspective view of a patch panel fitted with intelligent port monitoring components.

FIG. 17 is a perspective view of a 24 port, 1U patch panel modified for use with intelligent patch panel monitoring. In intelligent patch panel systems, a circuit board may be installed on the face of the patch panel in order to provide a connection point for monitoring connections. Such systems are described in pending U.S. patent application Ser. No. 12/247,472, the entire contents of which are incorporated herein by reference.

Figure 18:
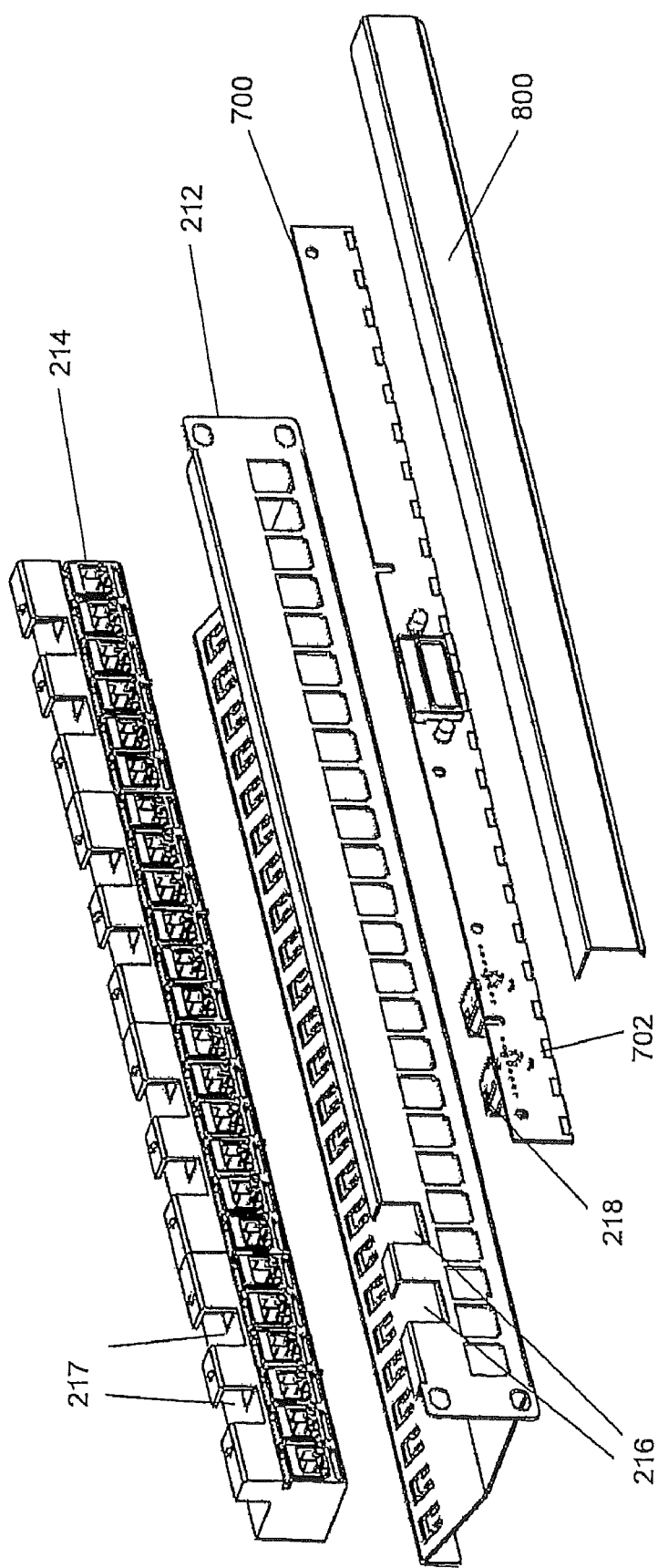
FIG. 18 is an exploded, perspective view of the patch panel of FIG. 17.

FIG. 18 is an exploded perspective view of a 24 port, 1U patch panel modified for use with intelligent patch panel monitoring. The patch panel frame 212 is similar to patch panel frame 12, with the exception the patch panel frame 212 includes cutouts 216 for receiving jacks 218 on the back of circuit board 700. Circuit board 700 includes contact points 702 for making electrical contact with monitoring contacts. A cover 800 is used to conceal the circuit board 700. The single row, multiport bezel 214 is similar to single row, multiport bezel 14 with the exception that single row, multiport bezel 214 includes cutouts 27 for accommodating jacks 218 on the circuit board 700.

Figure 19:
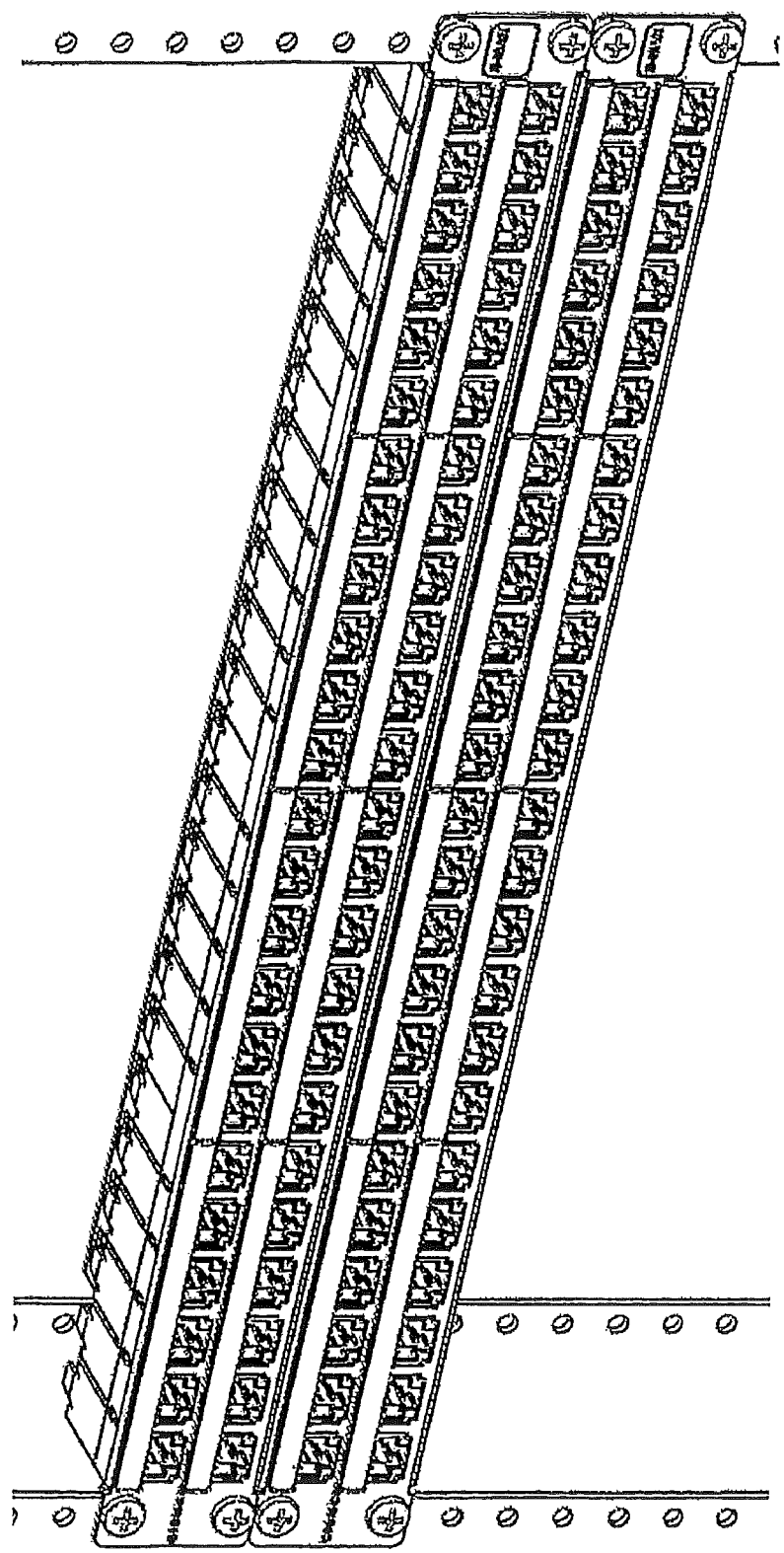
FIG. 19 is a perspective view of two patch panels mounted to a rack.

FIG. 19 is a perspective view of two 48 port, 1U patch panels mounted in a rack. When two 48 port, 1U patch panels are mounted in this fashion, the spacing between outlets in both the horizontal and vertical directions is substantially similar, both within a panel and across panels. This improves performances by providing consistent inter-outlet effects (e.g., Alien near-end crosstalk) between panels.

Embodiments of the invention provide faster and easier installation of pre-terminated outlets, faster and easier cable management, high density with improved performance, port labeling with options for standard printer labels and or port id icons. Installation of outlets is superior to currently available products on the market in that the outlets are snapped into place with one linear motion instead of multiple actions required for securing. Cable management is superior in that standard zip-ties are used without the need for lacing through features and that the tie down features on the panel provide built in anti-snag features. Port ID is an improvement in flexibility of labeling in that it accepts standard size labels from market leading printers and custom port ID Icons.

Embodiments take the terminate-out-of-panel concept one step further in that it supports fast and easy fixing of the individual outlets to the panel. Outlets may also be removed without special tools (space permitting) and reinstalled multiple times into the same or other locations in the panel in a single linear motion. Outlets are held in place with a latch.

Proper cable management is an integral component in ensuring consistent high performance. Embodiments provide cable tie feature that allows the end user to first install the cable tie on the intended cable and then secure it to the panel manager without fishing the cable tie through holes. Additionally, the tie down feature has a built in anti-snag frame around it to keep the neighboring cables from being caught or damaged.

Port identification is typically required and the bare minimum is usually a port ID number. Embodiments allow the end user to enhance the port identification with a clear plastic label and icon holder. The label holder holds pre printed labels, standard labeler printed labels, and custom icons displaying phone, data, or other type symbols or text. The label holder is snapped into place with defeatable snap features. Port ID may be easily changed or revised without removing adhesives or other semi-permanent markings.

While the invention has been described with reference to exemplary embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed for carrying out this invention.

What is claimed is:

1. A patch panel for telecommunications connectors comprising:
    a patch panel frame having a front face, the front face having a series of openings therein, each of the openings for receiving a single telecommunications plug;
    the patch panel frame including a tray extending rearward from a bottom portion of the front face; and
    a plurality of multiport bezels mounted to the patch panel frame behind the front face, each multiport bezel having a plurality of cavities, each cavity aligned with one of the openings in the front face.

2. The patch panel of claim 1 wherein:
    the openings in the front face and the cavities in the multiport bezel are arranged in a single row.

3. The patch panel of claim 1 wherein:
    the openings in the front face and the cavities in the multiport bezel are arranged in two horizontal rows.

4. The patch panel of claim 3 further comprising:
    two label holders, each label holder being positioned adjacent to one of the rows of openings to provide separate labeling for each row of openings.

5. The patch panel of claim 4, wherein:
    the patch panel frame has 48 openings and takes up one rack unit.

6. The patch panel of claim 1 wherein:
    the patch panel frame includes a tray, the tray including a lip formed off a rear portion of the tray, the lip having two ground lug mounting locations at each end thereof.

7. The patch panel of claim 1 wherein:
    the patch panel frame includes a tray, the tray including cable tie downs, the cable tie downs having rectangular opening with T-shaped prong in the rectangular opening.

8. The patch panel of claim 7 wherein:
    the cable tie downs are arranged in two rows.

9. The patch panel of claim 1 wherein:
    the multiport bezel includes a notch running along a front face of the multiport bezel, the notch receiving a conductive strip, the conductive strip making physical and electrical contact with the patch panel frame.

10. The patch panel of claim 9 wherein:
    the conductive strip is a conductive, compressible foam.

11. The patch panel of claim 9 wherein:
    the conductive strip is positioned to make contact with a housing of an outlet mounted in on of the cavities.

12. The patch panel of claim 1 wherein:
    the multiport bezel includes a linear guide on a bottom surface thereof, the tray having a slot for receiving the linear guide and aligning the multiport bezel with the patch panel frame.

13. The patch panel of claim 12 further comprising:
    a tension member in the tray, the tension member applying force to a bottom surface of the multiport bezel.

14. The patch panel of claim 1 further comprising:
    a label holder; and a cutout in the multiport bezel, the cutout extending below the opening in the front face of patch panel, the cut out receiving a latch on the label holder.

15. The patch panel of claim 14 wherein:

the latch on the label holder includes an arcuate body having a protrusion on an upper surface of the body.

16. The patch panel of claim 1 further comprising:

a patch panel monitoring circuit board mounted to the front face of the patch panel frame, the front face of the patch panel frame including cutouts for receiving jacks on the circuit board.

17. A telecommunications rack comprising:

a first patch panel having two rows of openings, the openings having a horizontal spacing and a vertical spacing;

a second patch panel mounted adjacent the first patch panel, the second patch panel having two rows of openings, the openings having the same horizontal spacing and the same vertical spacing;

wherein a row of openings in the first patch panel is spaced from a row in the second patch panel by the same vertical spacing.

18. The telecommunications rack of claim 17 wherein:

the second patch panel has a label holder positioned above a first row of openings; and the first patch panel has a second row of openings positioned above the first row of openings, the label holder positioned between the first row of openings and the second row of openings.

\* \* \* \* \*